Sept. 19, 1939.　　　V. BERTELLI ET AL　　　2,173,511
SURF-FISHING DEVICE
Filed Oct. 24, 1938
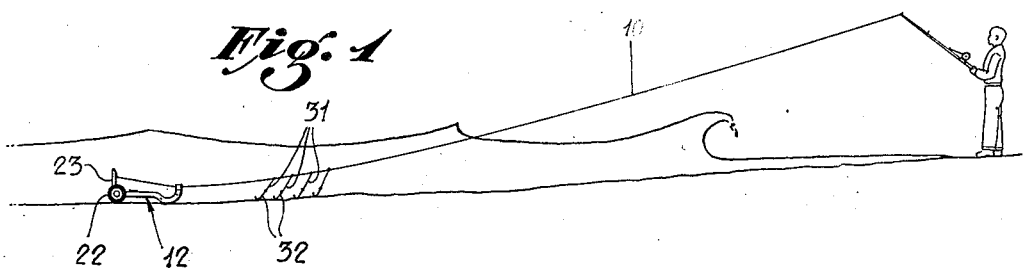
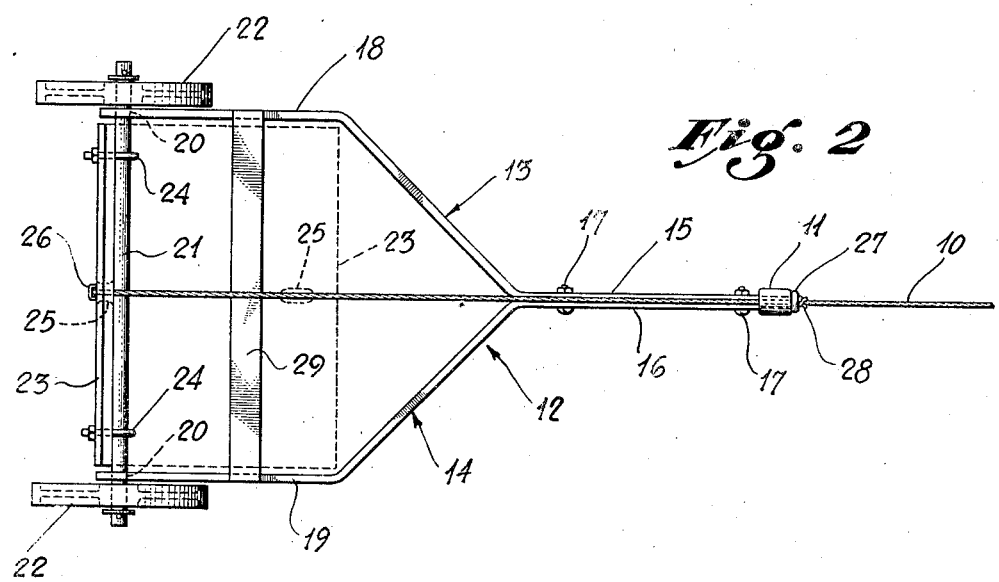
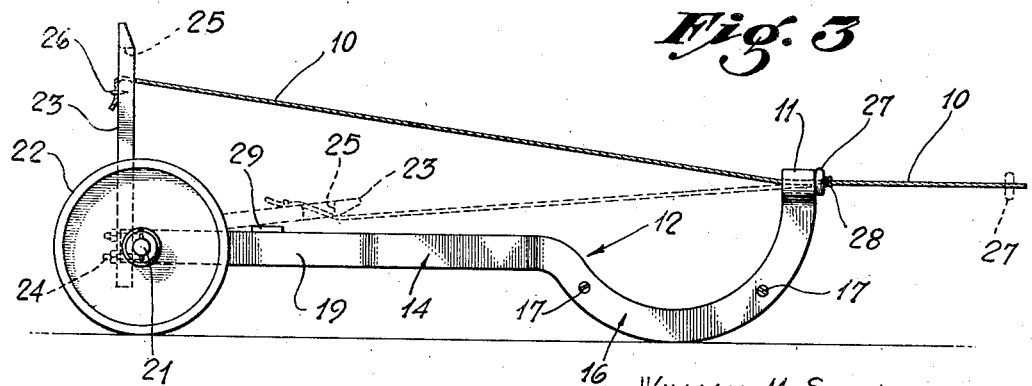
WILLIAM M. SHRODE and
VICTOR BERTELLI,
INVENTORS;
BY James M. Abbett
ATTORNEY.

Patented Sept. 19, 1939

2,173,511

UNITED STATES PATENT OFFICE 2,173,511

SURF-FISHING DEVICE

Victor Bertelli, South Gate, and William M. Shrode, Golita, Calif.

Application October 24, 1938, Serial No. 236,696

10 Claims. (Cl. 43—4)

This invention relates to fishing tackle and particularly pertains to a surf fishing device.

In deep-sea fishing it is common to provide a line with a sinker which drags along the floor of the ocean, and to which line at a point above the sinker there is attached one or more leaders carrying hooks. In deep-sea fishing of this type, particularly when fishing is done in the surf, the breakers and movement of the water towards the shore will gradually wash the sinker and a portion of the line carrying the lead lines and hooks into the shore. Thus, the hooks will eventually reach such a shallow water depth as to require that the line be reeled in and re-cast.

It is well-known that in surf waters of the ocean there is a considerable undertow movement after a breaker has reached the shore, and it is the principal object of the present invention to provide a fishing tackle device which may be used in the surf and will be affected by the undertow of the surf water to move the end of the line outwardly along the floor of the ocean and to control or retard such movement so that the fishing hooks will be maintained in a desired depth of water.

The present invention contemplates the provision of a structure adapted to rest upon and move along the floor of the ocean and which in effect acts as a travelling sinker or anchor for the free end of a fishing line, the structure being connected with the line in such a manner as to render the device susceptible to the action of the undertow of the water while not being affected by the breakers, and making it possible for the device to be readily pulled in to the shore without being subjected to the resistance of the water in undertow flow during the pulling operation.

The invention is illustrated by way of example in the accompanying drawing, in which:

Figure 1 is a view in elevation showing the application of the present invention in surf fishing.

Fig. 2 is a view in plan showing the device with which the present invention is concerned.

Fig. 3 is a view in side elevation showing the device in solid lines in the position it assumes when affected by the undertow and showing in dotted lines the position assumed by the parts of the device when the structure is drawn into shore.

Referring more particularly to the drawing, 10 indicates a fishing line which is here shown as threaded through an eye member 11 in a frame structure 12. The frame structure may be formed from a pair of bar elements 13 and 14 having separate parallel portions 15 and 16 forming a tongue for the device and at the forward end of which the eye 11 is formed. The portions 15 and 16 may be fastened together by bolts 17. The bars 13 and 14 of the frame are shown in Fig. 2 of the drawing as having outwardly diverging parts terminating in parallel side elements 18 and 19. The side elements are formed at their ends with bearings 20 which receive an axle 21. Mounted upon the axle 21 are wheels 22. It is to be understood that while the structure is here shown as fitted with wheels that it may be in the form of a sled or skid embodying the use of runners, as are shown in Fig. 3 of the drawing. These runners are here indicated as being the portions 15 and 16 which are curved downwardly and upwardly to form an arcuate blade which would slide along the sand on the ocean floor. Similar runners could be formed at the rear of the frame structure in place of the wheels if desired.

Pivotally mounted upon the axle 21 is a blade 23. This blade swings vertically around the axis of the axle and is here shown as connected thereto by U-bolts 24 which embrace the axle and extend through openings in the blade adjacent its lower and forward edge. The blade is designed to swing from a vertical to a horizontal position, and in order to control its operation the fishing line 10 is led through the eyelet 11, then through an opening 25 in the blade, where it is secured to the blade by a fastening element 26.

A button or washer 27 is positioned on the line 10 and its movement toward shore is limited by a stop element such as a knot 28. The position of the stop and the washer determine the length of line extending to the blade, and as shown in Fig. 3 of the drawing this is adjusted so that when the blade is at the limit of its forward swinging motion it stands substantially vertically. While in this position it offers an obstruction to the flow of water in the undertow, thus causing the entire structure to move outwardly when the undertow strikes the vertically disposed blade.

Disposed across from one of the frame elements to the other and in the area occupied by the lengths 18 and 19 is a stop bar 29. This bar limits the downward swinging movement of the blade and also holds the blade so that it will be disposed at an angle to the horizontal sufficient to permit it to be encountered by the water in an undertow and tend to swing the blade from its horizontal dotted line position to its vertical solid line position, as shown in Fig. 3. The edge of the free end of the blade is bevelled, as indicated at 30 in the drawings. It will be seen that this facilitates in the impingement of the water and the undertow against the under face of the blade rather than against the end of the blade, so that the blade will tend to swing upwardly in direct response to the pressure applied against it.

It is to be understood that in the operation of a device of this character a series of lead lines 31 may be fastened to the fishing line 10 at a point intermediate the fishing tackle device and the shore. These lines carry hooks 32.

In operation of the present invention the fishing line is properly fitted with suitable lead lines and hooks and its outer end is fastened through the opening 24 of the blade 23, where it is held by the fastening element 26. The stop 28 and the button 27 are adjusted so that when the blade 23 is in its vertical position the length of fishing line 10 between the blade and the eye 11 will insure that the blade will be held against further forward swinging movement. After the tackle has been properly set up and connected the fishing tackle structure may be placed in the water of the surf with the wheels 21 outermost. When the breakers roll in towards the shore they will swing the blade downwardly from the solid line position shown in Fig. 3 to the dotted line position in the same figure, thus insuring that the water on its inward movement will not encounter a vertically disposed blade 23 and move the fishing device in toward the shore but that the water will wash over the device and leave it substantially in the position it had assumed before being struck by the wave. When the undertow of the wave moves out to sea the water will engage the inclined face 30 at the end of the blade 23 and will then swing the blade upwardly to its vertical position.

Attention is directed to the fact that while the hinge connection between the blade and the axle provides a simple and inexpensive structure that it also provides a type of hinge which facilitates in permitting the blade to swing around and to a vertically aligned position in advance of the axle. Thus, the motion of the water in the undertow will be free to strike the blade and to hold it in its vertically aligned position on the outward movement of the water, and as long as the fishing line is "payed out" the fishing device will move farther out to sea as carried by each successive undertow.

When it is desired to pull the fishing device back into shore the fishing line 10 is pulled upon and this will impart a pulling action upon the upper free end of the blade with a result that the blade will be pulled downwardly to its position as shown by dotted lines in Fig. 3 of the drawing, so that its ability to offer resistance to the undertow will be practically eliminated and it may be drawn in to shore by a direct pull upon the fishing line. It will be recognized that when the wheels 22 are used the movement of the fishing device along the floor of the ocean will be greatly facilitated, although it would be possible to construct the device with skids or runners and obtain generally the same result.

It will thus be seen that the invention as here disclosed is decidedly simple in construction and inexpensive as to manufacturing cost, and that furthermore, there is no great liability that the device will be damaged or worn by use, and that irrespective of the roughness of the sea the structure will act to draw the end of the fishing line out to sea and along the floor of the ocean for efficient fishing operations.

While we have shown the preferred form of our invention as now known to us, it will be understood that various changes may be made in combination, construction and arrangement of parts by those skilled in the art, without departing from the spirit of our invention as claimed.

Having thus described our invention, what we claim and desire to secure by Letters Patent is:

1. A fishing device adapted to be attached to a line and to rest upon the floor of the ocean, and means forming a part thereof acting as an obstruction to the flow of the water in one direction and offering relatively no resistance to the flow of the water in an opposite direction whereby the alternate flow of water will move the fishing device in one direction only.

2. A fishing device adapted to be attached to a line and to rest upon the floor of the ocean, means forming a part thereof acting as an obstruction to the flow of the water in one direction and offering relatively no resistance to the flow of the water in an opposite direction whereby the alternate flow of water will move the fishing device in one direction only, and means for rendering said action ineffective in moving the fishing device in either direction.

3. A surf fishing device comprising a line, a fishing device attached thereto, said device being capable of movement along the floor of the ocean, and means carried thereby adapted to provide an obstruction to the flow of water in an undertow to move the device out to sea and acting automatically to eliminate obstruction to the flow of the waves moving towards the shore.

4. A surf fishing device comprising a frame structure adapted to move along the floor of the ocean, a blade mounted thereon and adapted to move from a substantially horizontal to a substantially vertical position, said blade swinging from its horizontal position to its vertical position by action of the water in its undertow movement, and a fishing line connected to the blade whereby it may be drawn to a horizontal and non-obstructing position as the fishing device is drawn in to the shore.

5. A surf fishing device comprising a frame structure adapted to move along the floor of the ocean, a blade mounted thereon and adapted to move from a substantially horizontal to a substantially vertical position, said blade swinging from its horizontal position to its vertical position by action of the water in its undertow movement, a fishing line connected to the blade whereby it may be drawn to a horizontal and non-obstructing position as the fishing device is drawn in to the shore, and a guide on the frame through which the line extends.

6. A surf fishing device comprising a frame structure adapted to move along the floor of the ocean, a blade mounted thereon and adapted to move from a substantially horizontal to a substantially vertical position, said blade swinging from its horizontal position to its vertical position by action of the water in its undertow movement, a fishing line connected to the blade whereby it may be drawn to a horizontal and non-obstructing position as the fishing device is drawn in to the shore, a guide on the frame through which the line extends, and stop means carried by the line and cooperating with the guide to limit the movement of the blade as it swings toward the vertical.

7. A surf fishing device comprising a frame, a running gear therefor, a blade pivotally mounted on said frame and adapted to swing from a horizontal to a vertical position in which vertical position the blade will stand in the path of the water moving in an undertow, a guide on the frame, a fishing line extending therethrough and attached to the free edge of the blade, and stop means on the line cooperating with the guide to limit the vertical swinging movement of the blade.

8. A surf fishing device comprising a frame, a running gear therefor, a blade pivotally mounted on said frame and adapted to swing from a horizontal to a vertical position in which vertical position the blade will stand in the path of the water moving in an undertow, a guide on the frame, a fishing line extending therethrough and attached to the free edge of the blade, stop means on the line cooperating with the guide to limit the vertical swinging movement of the blade, and stop means on the frame to be encountered by the blade when in its substantially horizontal position.

9. A surf fishing device comprising a frame, a running gear therefor, a blade pivotally mounted on said frame and adapted to swing from a horizontal to a vertical position in which vertical position the blade will stand in the path of the water moving in an undertow, a guide on the frame, a fishing line extending therethrough and attached to the free edge of the blade, stop means on the line cooperating with the guide to limit the vertical swinging movement of the blade, and stop means on the frame to be encountered by the blade when in its substantially horizontal position, said stop means supporting the free end of the blade at an angle to the horizontal whereby water may act against the under face of the blade tending to swing the blade to its upper position.

10. A surf fishing device comprising a frame, a running gear therefor, a blade pivotally mounted on said frame and adapted to swing from a horizontal to a vertical position in which vertical position the blade will stand in the path of the water moving in an undertow, a guide on the frame, a fishing line extending therethrough and attached to the free edge of the blade, stop means on the line cooperating with the guide to limit the vertical swinging movement of the blade, and stop means on the frame to be encountered by the blade when in its substantially horizontal position, said stop means supporting the free end of the blade at an angle to the horizontal whereby water may act against the under face of the blade tending to swing the blade to its upper position, the under face of the blade adjacent its free edge being inclined to facilitate in the swinging action of the blade.

WILLIAM M. SHRODE.
VICTOR BERTELLI.